(No Model.) 3 Sheets—Sheet 1.

F. PURDON & H. E. WALTERS.
ROLLER BEARING.

No. 507,162. Patented Oct. 24, 1893.

Witnesses
Arthur Woodman
William B. Cand[?]

Inventors
Fred Purdon
& Harry E. Walters
per John P. O'Donnell
Attorney.

(No Model.) 3 Sheets—Sheet 2.

F. PURDON & H. E. WALTERS.
ROLLER BEARING.

No. 507,162. Patented Oct. 24, 1893.

Witnesses
Arthur Woodman
William B. Caudy

Inventors
Fred Purdon & H. E. Walters
per John P. O'Donnell
Attorney.

(No Model.) 3 Sheets—Sheet 3.

F. PURDON & H. E. WALTERS.
ROLLER BEARING.

No. 507,162. Patented Oct. 24, 1893.

Witnesses
Arthur Woodman
William B. Candy

Inventors
Fred Purdon & H. E. Walters
per
John P. O'Donnell
Attorney.

UNITED STATES PATENT OFFICE.

FREDERICK PURDON AND HARRY ERNEST WALTERS, OF LONDON, ENGLAND.

ROLLER-BEARING.

SPECIFICATION forming part of Letters Patent No. 507,162, dated October 24, 1893.

Application filed January 25, 1893. Serial No. 459,746. (No model.)

*To all whom it may concern:*

Be it known that we, FREDERICK PURDON and HARRY ERNEST WALTERS, civil engineers, subjects of the Queen of Great Britain and Ireland, residing in Westminster, London, England, have invented new and useful Improvements in End-Thrust Ball and Roller Bearings, of which the following is a specification.

Our invention relates to improvements in ball and roller bearings.

Our object has been to diminish friction between journals and their bearings, between thrust collars and thrust blocks, and between foot steps and their supports.

This invention consists in the novel construction and combination of the parts hereinafter fully described and claimed.

Figure 1:
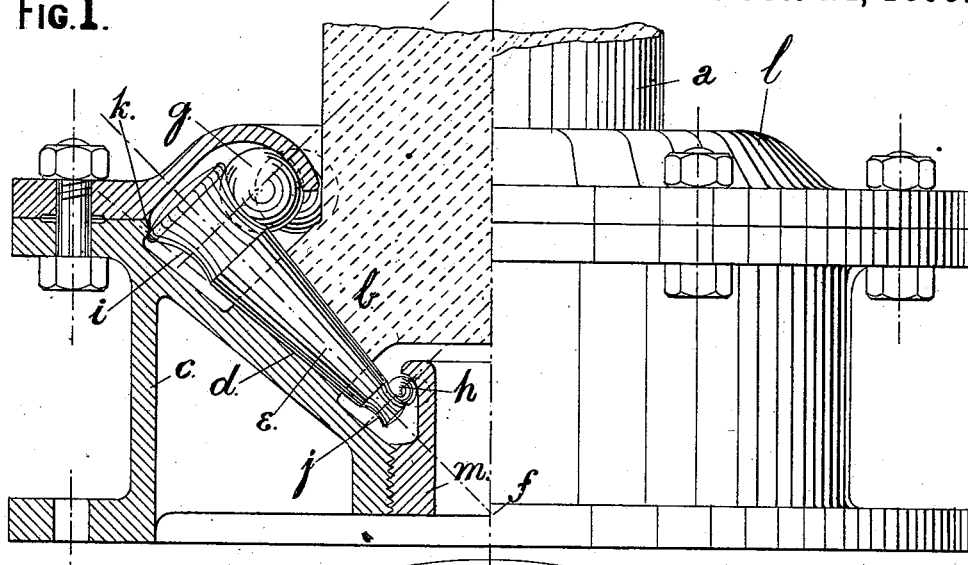
Figure 2:
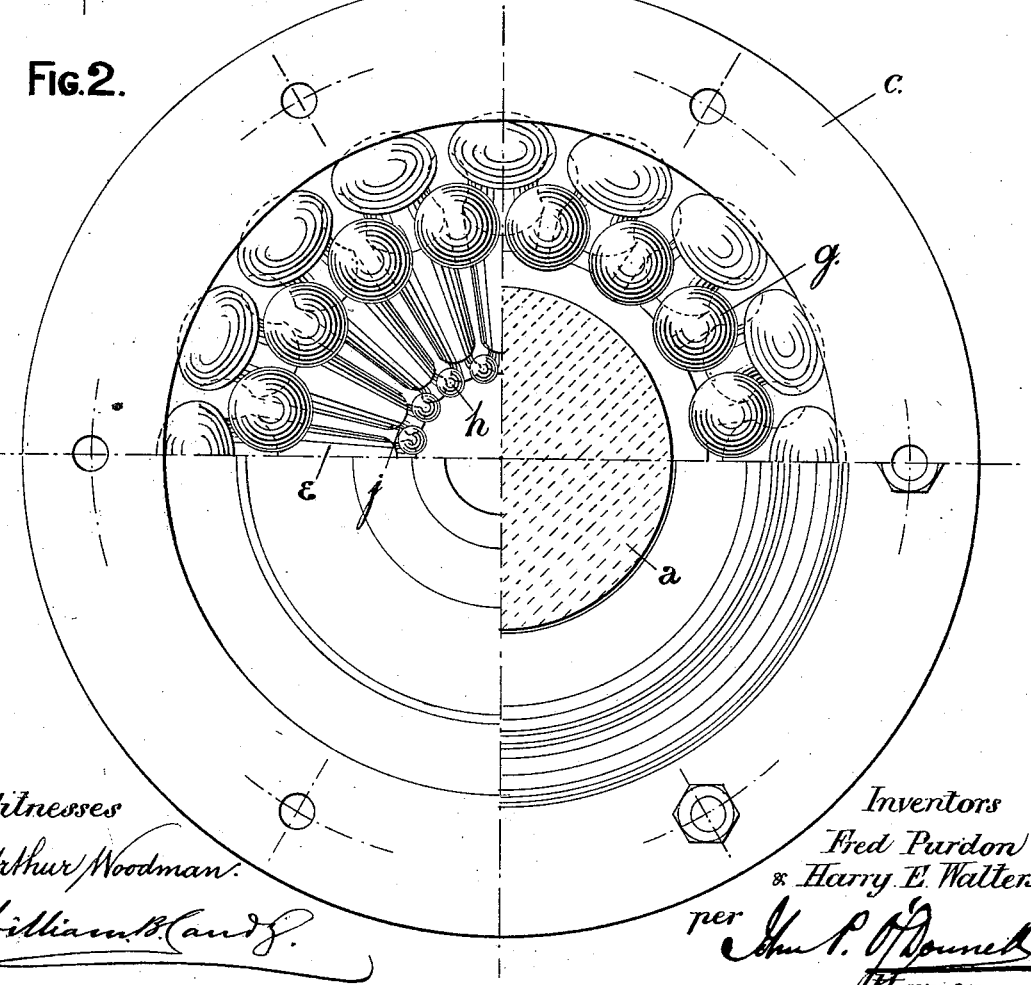
Figure 3:
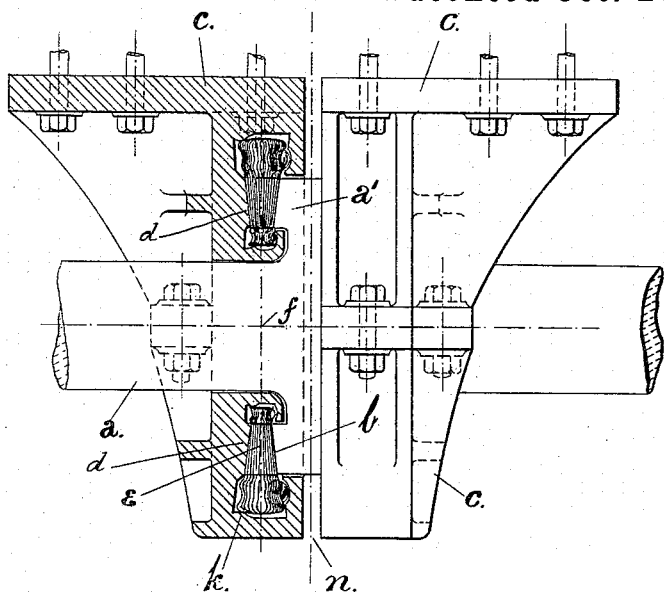
Figure 4:
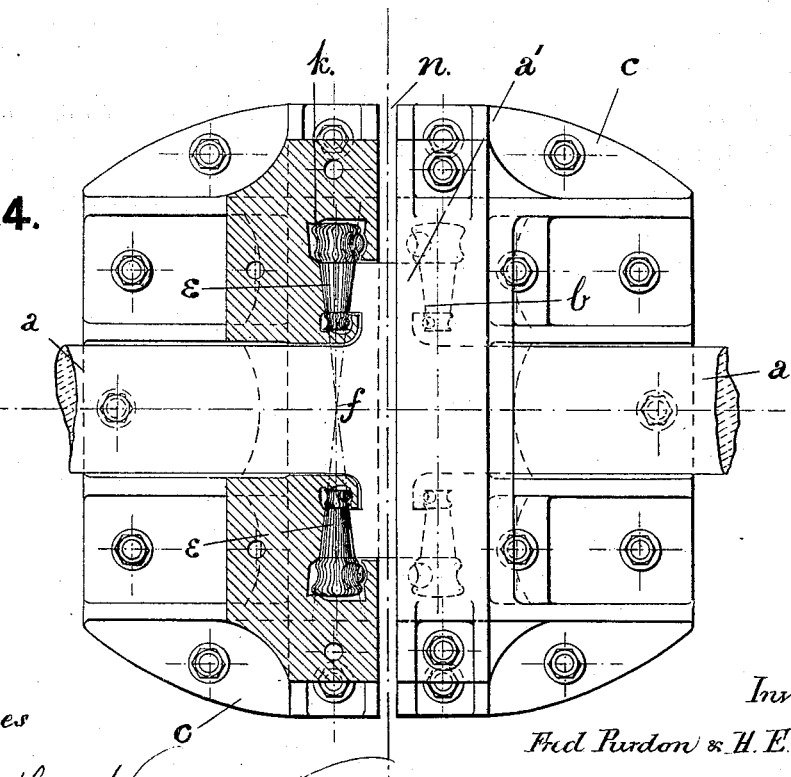
Figure 5:
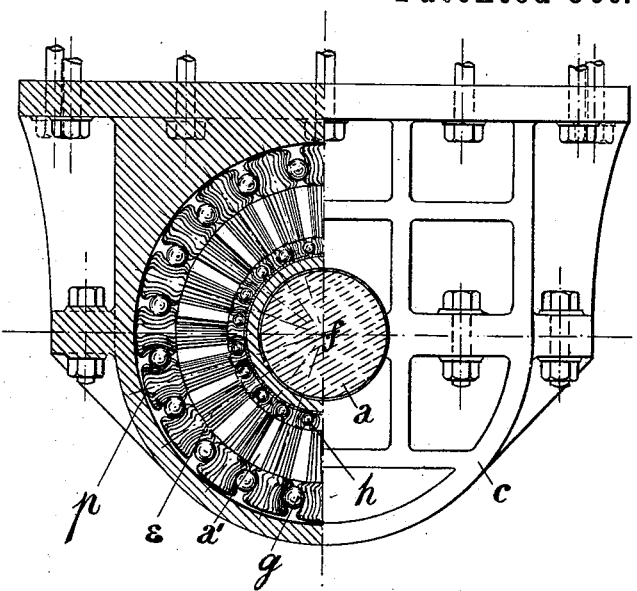
Figure 6:
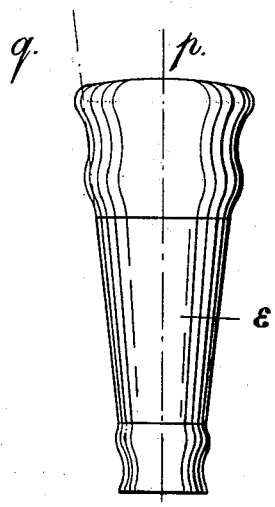

In the accompanying drawings, Figures 1 and 2 represent the arrangement we use for a footstep bearing, Fig. 1 being an elevation, the left half being in section, and Fig. 2 a plan, the right lower quadrant showing the cover and shaft in position, the right upper quadrant, the cover removed, the left upper quadrant the cover and shaft both removed, and the left lower quadrant the cover, shaft, rollers, and balls all removed. Figs. 3, 4 and 5 represent the arrangement we use for a thrust bearing, such as is required for a propeller shaft. Fig. 3 shows a side elevation, the left half being in section. Fig. 4 is a plan, the left half in section. Fig. 5 is an end elevation, the left half in section, and Fig. 6 is a detail view of one of the rollers.

Similar letters refer to similar parts throughout the several views.

The vertical shaft $a$, Figs. 1 and 2, is provided at its lower end with an enlargement $b$ turned so that it forms the frustum of a cone, the case $c$ is bored out with a surface $d$, and the rollers $e$ are so made as to roll between the surfaces $b$ and $d$. The single and essential requirement for correct working so that only rolling motion is obtained, is that the rollers $e$ and the surfaces $d$ and $b$ shall all form parts of cones whose apices meet in the common point $f$. The next point requiring attention is to prevent the said rollers from touching each other; this is effected by the interposition of a ball $g$ between the upper ends of each adjoining pair of rollers and of a ball $h$ between the lower ends of each adjoining pair of rollers.

The spacing balls $g$ and $h$ not only effect the purpose of keeping the rollers from touching each other, but they also run truly upon the stationary path provided, as shown upon the adjustable portions of the cases, where the shaft is rotated, and in this manner sliding friction of the balls as well as of the rollers is entirely avoided. In order to attain these objects the relative sizes of the balls $g$ and $h$, the diameter of the necks of the cones upon which the balls roll, and the diameter of the stationary path upon which the balls roll must be so arranged that the said balls $g$ and $h$ shall in their circular motion round the axis of the shaft have the same surface velocity imparted to them by their motion over their respective paths as is imparted to them by their respective ends of the said rollers, and the motion must be imparted to the balls in the same sense of rotation.

The upper end of each roller is hollowed out at $i$ and the lower end at $j$, to form a suitable surface for the balls to work upon. As the proportion of the downward pressure of the shaft upon each roller may be resolved into two components, one of which is at right angles to the axis of the roller and the other along that axis, it is obvious that the component at right angles to the axis has no tendency to cause the roller to move in the direction of its own axis and away from the apex $f$. The other and very much smaller component acting along the axis would tend to cause a movement of the roller in the direction of its own axis and in a sense away from the apex $f$; this motion is prevented by the path $k$ turned upon the inside of the case $c$; this path and the top of the roller are so formed that if the roller were to touch the path $k$ it would do so at a point lying upon the surface of a cone with apex at $f$ and so cause no sliding motion whatever.

The balls $g$ are held in position by the cover $l$ which is formed to receive them and to provide an internal path upon which they can roll. Similarly the balls $h$ are held in position by the part $m$ which has an internal path cut upon itself. In Figs. 1 and 2 we have shown the axis of each roller inclined to the vertical at an angle of forty-five degrees, but there is no reason why this particular angle should be retained, and it is obvious that the principle would remain the same were the axes inclined at a different angle to the vertical. The number and size of balls and rollers also depends upon the size of the vertical shaft $a$ and the load which is to be carried.

The cover $l$ may be secured to the case $c$ in any suitable manner, and it is so arranged in the case depicted that the cover $l$ can be let down slightly to take up wear of the balls $g$; the adjustment of the part $m$ by the screw is obvious.

In Figs. 3, 4 and 5 the essential features are similar to those in Figs. 1 and 2. The shaft $a$ is here horizontal and is provided with a collar $a'$ with two rolling faces $b$. The rollers are similar to those described heretofore, the essential point in this design being that the conical surfaces $b$ and the rollers $e$ should have a common apex in $f$. The casings $c$ are made in halves, that is to say, the left hand case is intended to take a pressure toward the left, and is made in halves to allow of erection; the right hand case is made also in halves for a similar reason. A space $n$ is left between the two cases in order to allow of adjustment in case of wear of the two faces $b$ of the collar $a'$. Small projections $k$ are made upon the inside of the cases in order to prevent motion of the rollers in the direction of their own axes and in a sense away from the apex $f$.

In Fig. 5 the outer ends $p$ of the rollers $e$ are described with a radius which must be less than the radius of the chamber in which the rollers are placed in order that the ends may not cause a sliding motion to be produced.

In Fig. 6 the point $q$ which is designed to bear upon the projection $k$ inside the case must be upon a line which is a continuation of a line formed upon the surface of the roller by a plane passing through the axis.

What we claim is—

1. The combination, with a shaft provided with a conical bearing, of a series of conical rollers for the said bearing to run on, two series of balls $g$ and $h$ of different diameters for the ends of the rollers to run on, and a stationary support provided with a conical surface $d$ for the said rollers to run on, and two tracks for the said balls to run in, one track for each series, substantially as shown and described.

2. The combination, with a shaft provided with a conical bearing, of a series of conical rollers for the said bearing to run on, two series of balls $g$ and $h$ of different diameters for the ends of the rollers to run on, and a stationary support provided with a conical surface $d$ for the said roller to run on, a circular path $k$ for the edges of the larger ends of the cones to bear against, and two tracks for the said balls to run in, one track for each series, substantially as shown and described.

In testimony whereof we hereunto affix our signatures in the presence of two witnesses.

FREDERICK PURDON.
HARRY ERNEST WALTERS.

Witnesses:
WILLIAM B. CANDY,
ARTHUR WOODMAN.